G. B. PETSCHE.
STARTING MECHANISM FOR GAS ENGINES.
APPLICATION FILED DEC. 30, 1904.
991,454.
Patented May 2, 1911.
5 SHEETS—SHEET 2.
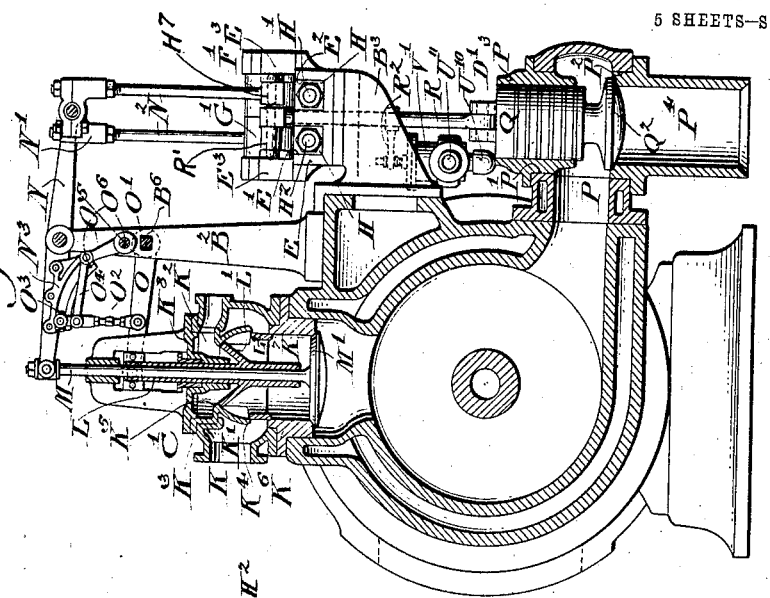
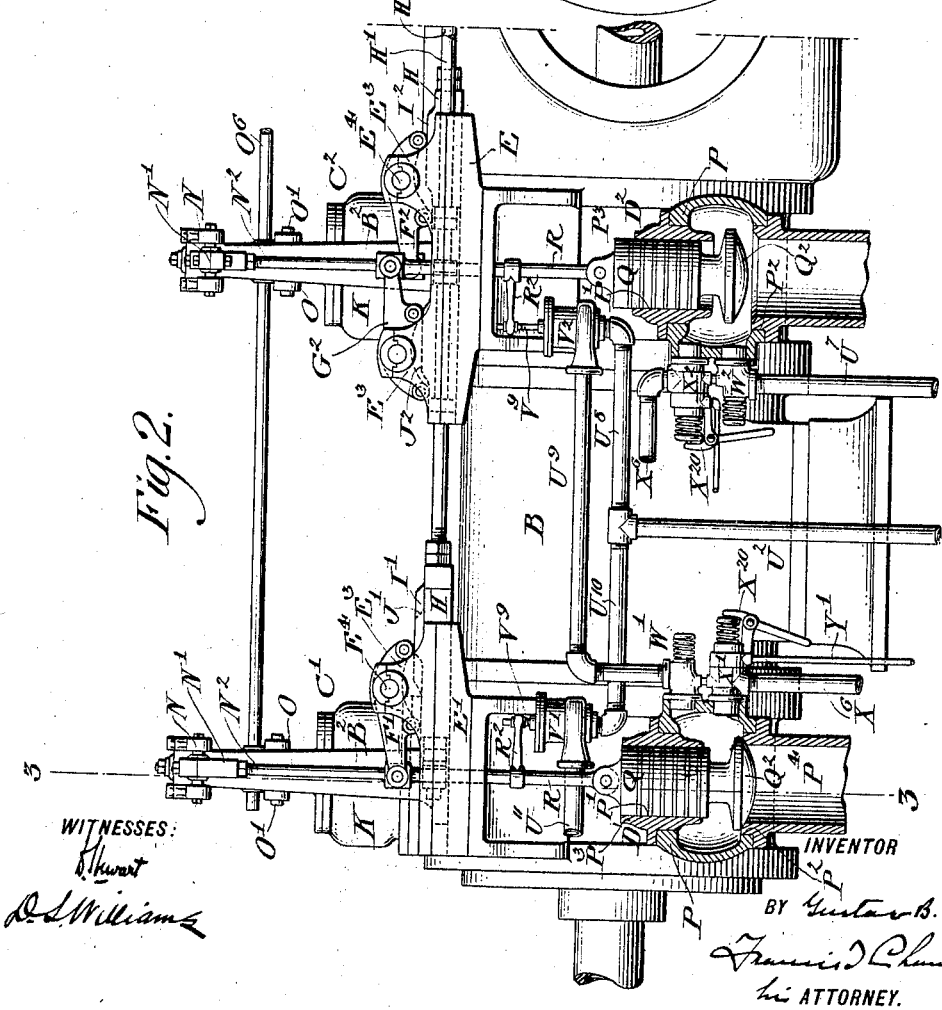

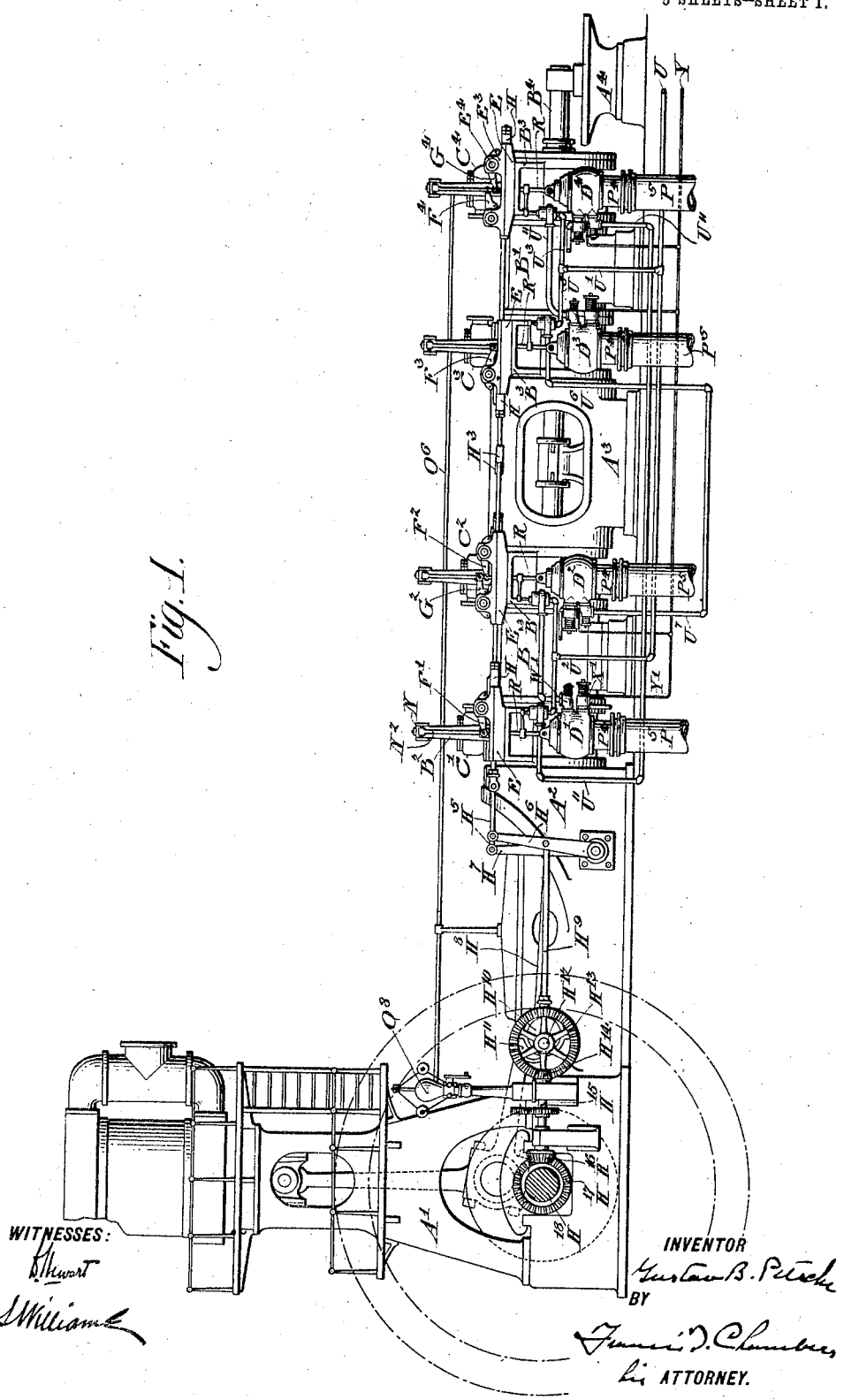

G. B. PETSCHE.
STARTING MECHANISM FOR GAS ENGINES.
APPLICATION FILED DEC. 30, 1904.

991,454.

Patented May 2, 1911.
5 SHEETS—SHEET 3.

WITNESSES:

INVENTOR
Gustav B. Petsche
BY
ATTORNEY.

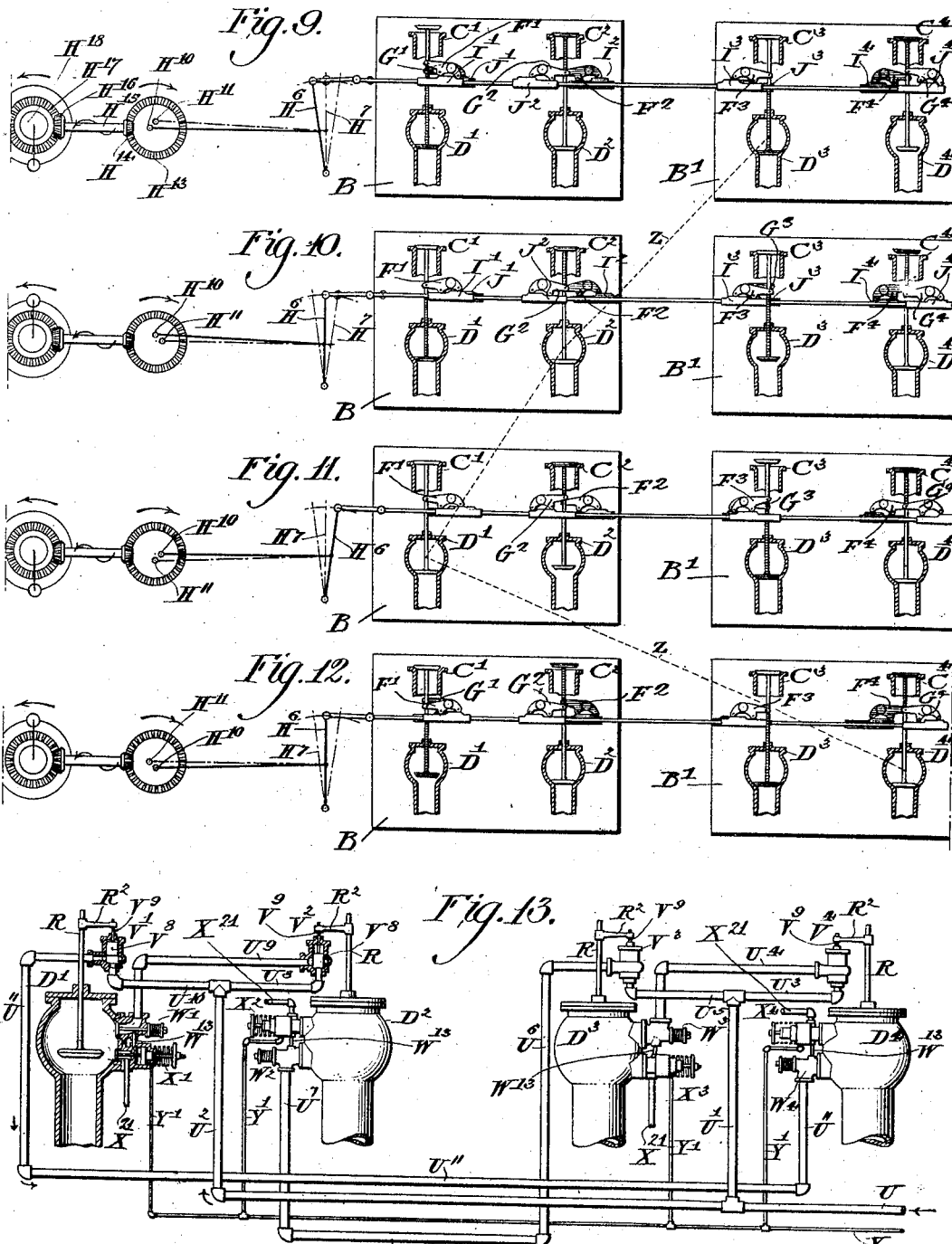

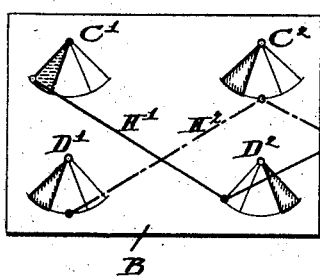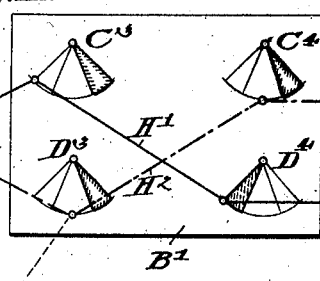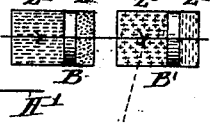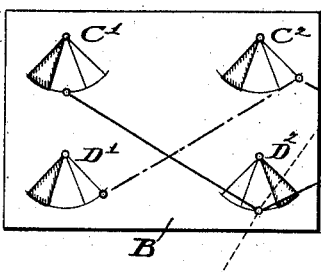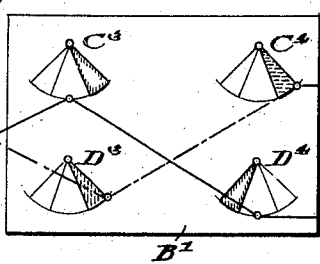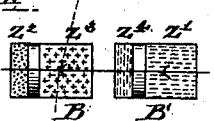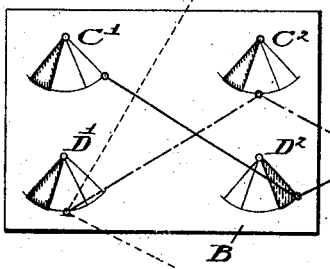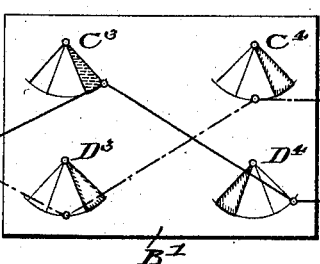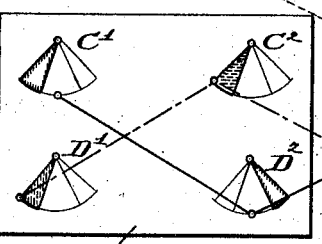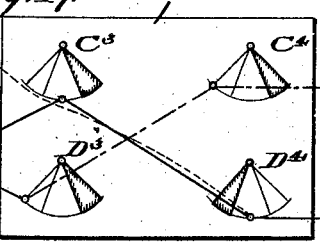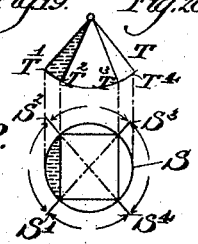

UNITED STATES PATENT OFFICE.

GUSTAV B. PETSCHE, OF PHILADELPHIA, PENNSYLVANIA, ASSIGNOR TO SOUTHWARK FOUNDRY & MACHINE COMPANY, OF PHILADELPHIA, PENNSYLVANIA, A CORPORATION OF PENNSYLVANIA.

STARTING MECHANISM FOR GAS-ENGINES.

991,454.   Specification of Letters Patent.   Patented May 2, 1911.

Application filed December 30, 1904. Serial No. 238,918.

*To all whom it may concern:*

Be it known that I, GUSTAV B. PETSCHE, a subject of the Emperor of Germany, residing in the city and county of Philadelphia, in the State of Pennsylvania, have invented a certain new and useful Improvement in Starting Mechanism for Gas-Engines, of which the following is a true and exact description, reference being had to the accompanying drawings, which form a part thereof.

My invention relates to gas engines and has for its object to provide a system of appliances for use in starting such engines by the aid of compressed air admitted in proper sequence into the cylinders of the engine; particularly my invention relates to gas engines working on the four cycle system and, broadly speaking, it consists in a system of compressed air pipes, one leading into each cylinder end and having, in each case, a check valve, opening under pressure, to deliver the gas into the cylinder, It also consists further in controlling valves provided in these supply pipes and located in advance of the check valves, and in connecting these controlling valves with the regular valve system of the engine in such manner that each controlling valve is actuated so as to open it, by the movement of one of the regular valves, which valve moves at or immediately before the time when in the regular running of the engine, an explosion takes place in the cylinder end into which the opening of the controlling valve admits the compressed air.

It further consists in means for exhausting the compressed air from the cylinder at the end of the piston stroke which is effected by its aid.

This, and other features of my invention and improvements, will be best understood as described in connection with the drawings in which my invention is illustrated as applied to a two cylinder tandem gas engine working in connection with a blowing engine, and in which—

Figure 4:
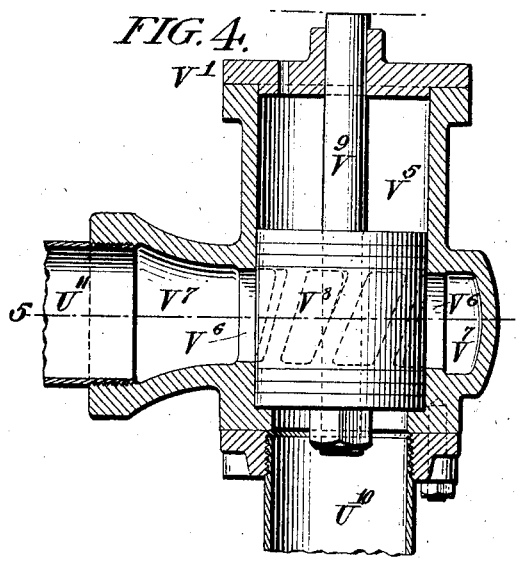
Figure 5:
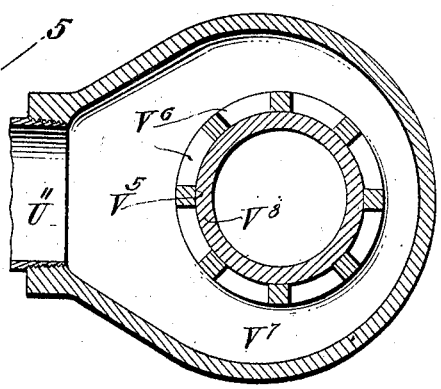
Figure 6:
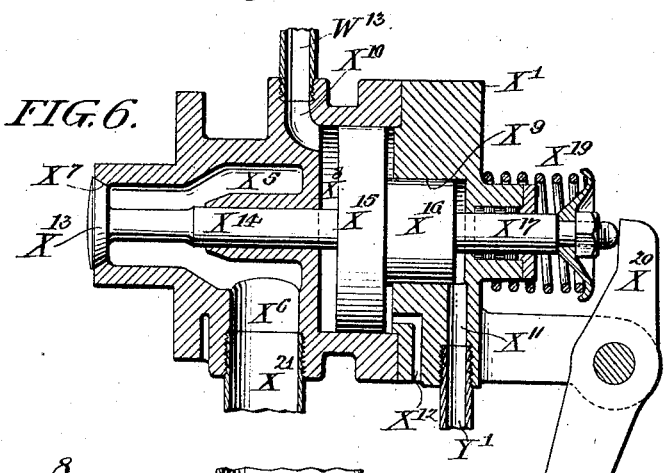
Figure 7:
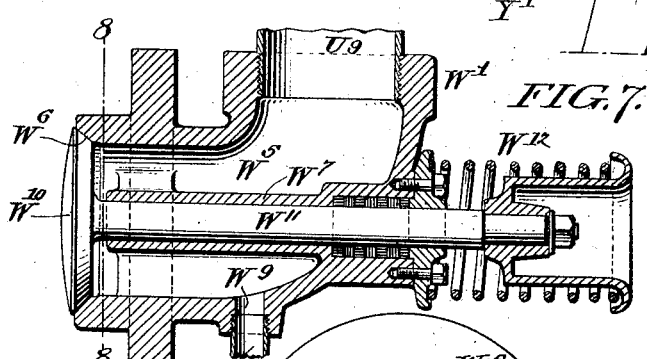
Figure 8:
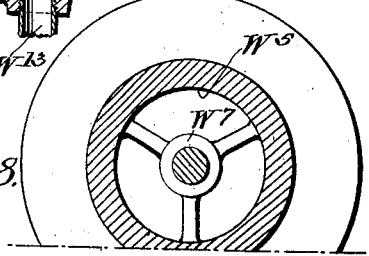

Figure 1, is an elevation of the engine, Fig. 2, an enlarged elevation of the inner of the two engine cylinders, showing the exhaust valve casings of the engine in section. Fig. 3, is a cross section taken as on the line 3—3 of Fig. 2. Fig. 4, is a sectional elevation of the controlling valve. Fig. 5, is a cross-section on the line 5—5 of Fig. 4. Fig. 6, a sectional elevation of the exhaust valve and connected mechanism forming part of the starting mechanism. Fig. 7, a sectional elevation of the check valve used in connection with the starting system. Fig. 8, a cross-section on the line 8—8, of Fig. 7. Figs. 9 to 12 inclusive are diagrammatic views each showing the valve system of the engine and collectively illustrating the sequence in which the valves are operated. The dotted line connecting the various inlet ports shown in these diagrams illustrates the sequence in which air is admitted to the various cylinder ends in the operation of starting the engine. Fig. 13, is an elevation of the conduits and valves forming the starting system of the engine. Figs. 14 to 17, inclusive, are diagrammatic views, to be read in connection with the views numbered from 9 to 12, inclusive, illustrating the sequence in which the regular admission and exhaust valves of the engine cylinders are operated and also, by the connecting lines indicated at Z, the sequence in which the compressed air is admitted in the operation of starting the engine. Figs. 18 to 21, inclusive, are indications as to what is taking place in the similarly marked diagrammatic view shown at the right hand side of Figs. 14 to 17, and Fig. 22, is a diagrammatic view to be read in connection with Figs. 14 to 17.

The engine illustrated in connection with this application, leaving out of consideration the starting system is, in itself, a newly invented engine construction which forms the subject matter of my Patent No. 896,318, granted August 18, 1908 and applied for December 30, 1904, and is therefore not claimed in this application except in certain features, wherein the distinctive features of the engine are in operative combination with the starting system, and I will note here that while my starting system, as shown in the drawings, is especially adapted and intended for this particular engine, it is also well adapted for use in connection with other constructions of gas engines, and in my broader claims is intended to be covered in its general application.

Again referring to the drawings, A', Fig. 1 is a blowing engine, A², indicates the frame of the engine, A³, the center piece or distance piece separating the two cylinders of the engine, $A^4$, a crosshead guide for the crosshead secured to the outer end of the piston rod, as indicated; B, and B', indicate the inner and outer cylinders of the engine; $B^2$, a series of upwardly extending standards supported on the engine cylinders; $B^3$, $B^3$, etc., a series of outwardly extending brackets also supported on the engine cylinders; $B^4$, indicates the piston rod.

C', $C^2$, $C^3$ and $C^4$, indicate the admission valves for gas and air; D' $D^2$, $D^3$ and $D^4$, the exhaust valves of the engine. Slide guides E E are supported on the brackets $B^3$ and are formed with two parallel guideways indicated at $E^2$, $E^2$. $E^3$, $E^3$, are pivot bearings supported on the guideways E, and supporting the pivots $E^4$, $E^4$, etc., on which in turn are supported the three armed cam actuated rock levers F', $F^2$, $F^3$ and $F^4$, which are connected to actuate the admission valves and the similar levers G', $G^2$, $G^3$ and $G^4$, which are connected to actuate the exhaust valves.

H, H, etc., are slides moving in the guideways $E^2$, $E^2$, and connected by two parallel lines of rod indicated at H', and $H^2$, $H^3$, indicating the couplings by which sections of these rods are connected together. The rods H', and $H^2$, are connected by connecting rods $H^5$, with rock levers $H^6$, and $H^7$, which levers are in turn connected by rods $H^8$, $H^9$, with eccentrics $H^{10}$, and $H^{11}$, set at 90° apart and secured on a shaft $H^{12}$, which, through a miter gear wheel $H^{13}$, and bevel gear $H^{14}$, attached to the shaft $H^{15}$, and through the miter gear $H^{16}$, also attached to said shaft, and the gear $H^{17}$, attached to the main shaft $H^{18}$, of the engine are actuated so that the shaft $H^{12}$, makes one revolution to each two revolutions of the main shaft $H^{18}$. The slides H, have attached to or formed with them cams, part of which marked I', $I^2$, $I^3$ and $I^4$, Figs. 9 and 10, are arranged to act on levers F', $F^2$, etc., so as to actuate the admission valves while the other series of cams J', $J^2$, $J^3$ and $J^4$, are connected to actuate the rock levers G', $G^2$, $G^3$; etc., which actuate the exhaust valves, the arrangement as shown being such that considering the admission valves of the engine from left to right of Fig. 1, the valves are actuated alternately by cams connected with and moved by the rods H', and $H^2$, while the exhaust valves, considered in the same sequence, are actuated by cams alternately connected first with the rod $H^2$, and then with the rod H', etc.

The construction of the admission valves is best shown in Fig. 3, each valve having a casing K, with air admission chamber K', and gas admission chamber $K^2$, which chambers are further separated as shown by the separate part $K^3$, having the seat portions $K^4$, and $K^5$, formed on it. The casing is further made up as shown of a separate portion $K^6$, directly secured to the engine cylinder and having the seat $K^7$, at its bottom. L, is a hollow valve stem extending through a stuffing box in the casing having the outwardly extending valve portion L', which is adapted to seat itself on the seat $K^5$, and the cylindrical portion $L^2$, which is adapted to close the passage between the seat $K^4$, and the bottom of the chamber K'. Through the center of the hollow valve stem L, extends the valve stem M, having at its bottom the valve M', which is adapted to seat itself on the seat $K^7$. The valve stem M, is connected with the rock lever N, pivoted on the standard $B^2$, and connected at its other end through the pivot block N', with a rod $N^2$, which in turn is connected through pin $H^7$ to one of the levers F', $F^2$, which are intended to work upon the admission valve. I have shown in Fig. 3 the position of the valve rod $N^2$, connected with the lever F', at the right and the position of the next adjacent valve rod which would be connected with the lever $F^2$, at the left, and it will be seen how, by using the peculiarly shaped slide piece N', are made alternately to connect the rock levers N with cams on the different lines of reciprocating rods. $N^3$, Fig. 3, indicates a segmental slide, and O, is a lever connected to the hollow valve rod L, and pivoted on pivots O', which are mounted preferably as shown in Fig. 3 with their ends passing through horizontally elongated slots $B^6$ in the standards $B^2$, so that the pins O', while prevented from moving up or down, may move toward and away from the line of movement of the valve rod L as the latter reciprocates and the lever O correspondingly oscillates on the pivots O'. The levers O, are connected by links $O^2$, and slotted blocks $O^3$, with the segmental slides $N^3$, and the blocks $O^3$, are adjusted in said slide to vary the cut off of the engine through rods $O^4$, and lever arms $O^5$, connected to a rock shaft $O^6$, which extends through the standards $B^2$, and is operatively connected with a governor $O^8$, in any convenient way.

The particular construction of the admission valve described forms the subject matter of my copending application for Letters Patent filed March 7, 1906, Serial Number 304,627.

The construction of the exhaust valves is well shown in Figs. 2 and 3, valve casings P, connecting with the bottom of the cylinders and being formed with top and bottom cylindrical openings P', and $P^2$, in the upper one of which, as shown, is an open ended cylinder $P^3$, while in the lower one is secured the removable seat $P^4$, which, when withdrawn permits the withdrawal of the valve. The exhaust valve is made up of the cylindrical portion Q, moving in the cylinder $P^3$, and the valve proper indicated at $Q^2$, and these valves are connected through rods R, which pass up between the slides H, H, with rock levers $G'$, $G^2$, $G^3$, and $G^4$, actuated by cams attached to the rods $H'$, and $H^2$. The rods R connected at their lower ends to the valves $D'$ and $D^3$, are connected at their upper ends to the levers $G'$ and $G^3$, respectively, which are actuated by the cams reciprocated by the rod $H^2$ and the rods R connected at their lower ends to the valves $D^2$ and $D^4$ and connected at their upper ends to the levers $G^2$ and $G^4$, respectively, actuated by cams secured on the rod $H'$.

The particular construction of the exhaust valve proper described forms the subject matter of my copending application for Letters Patent filed March 7, 1906, Serial Number 304,626.

Passing now to the appliances which have to do exclusively with the starting of the engine, U, is a conduit for compressed air leading from any suitable source of supply and having branches $U'$, and $U^2$, the first of which is divided again into the branches $U^3$, and $U^5$, while the second original branch $U^2$, is divided into the branches $U^8$, and $U^{10}$, each of the final branches connecting with the bottom of one of the four valve casings indicated at $V'$, $V^2$, $V^3$ and $V^4$. The constructions of these valve casings are shown in Figs. 4 and 5. They comprise a cylindrical valve casing $V^5$, communicating through ports $V^6$, with an annular chamber $V^7$, a piston valve $V^8$, working in the cylindrical chamber and being actuated through a valve spindle $V^9$, which extends up through the top of the casing as shown. The valve casings $V'$, $V^2$, etc., are placed as shown in Fig. 13 so that they lie adjacent to the valve stems R, R, etc., of the exhaust valves and arms $R^2$, $R^2$, etc., are secured to the exhaust valve rods in such position that they extend over the spindle $V^9$, and when the exhaust valves are closed press down upon this spindle so as to move the valve $V^8$, into the position shown in Fig. 4, in which it closes the ports $V^6$. On the other hand when the exhaust valve is opened the arm $R^2$, is moved upward and the pressure of air entering the valve chamber $V'$, $V^2$, etc., moves the valve $V^8$, upward, so as to open the ports $V^6$. Each of the valve casings $V'$, $V^2$, etc., has its chamber $V^7$, connected by a conduit $U^{11}$, $U^9$, $U^6$, or $U^4$, with one of the valve casings $W'$, $W^2$, $W^3$, or $W^4$, the construction of which valve casings is shown in Figs. 7 and 8 which valve casings enter and are secured to the different exhaust valve casings of the engine and are formed with chambers $W^5$, terminating in outwardly facing valve seats $W^6$. $W^7$ indicates a guide for a valve spindle and $W^9$ an outlet passage. A valve $W^{10}$, secured on a valve spindle $W^{11}$, is normally held on the seat $W^6$, by the action of a spring $W^{12}$, the valve $W^{10}$, opening against the pressure of the spring when the pressure in the valve chamber is sufficient to overcome the spring pressure.

$W^{13}$, is a conduit leading from the port $W^9$, to that one of the valve casings indicated at $X'$, $X^2$, $X^3$, and $X^4$, which is secured to the same exhaust valve chamber as is the casing $W'$, etc. The construction of the valve chambers $X'$, etc., and connected mechanism is shown in Fig. 6. Each of these casings is formed with a chamber $X^5$, provided with an exhaust port $X^6$, from which leads an exhaust pipe $X^{21}$, the chambers also having outwardly facing valve seats $X^7$, opening into the exhaust valve casing to which the exhaust valve is attached. In the rear and entirely disconnected from the chamber $X^5$, is situated the cylindrical chamber $X^8$, having the cylindrical extension $X^9$, of smaller diameter, and having a port $X^{10}$, to which the pipe $W^{13}$, already referred to, is connected. A port $X^{11}$, connects with the rear end of the cylindrical chamber $X^8$. $X^{13}$, indicates the valve which is adapted to seat itself on the seat $X^7$, and is attached to a valve spindle $X^{14}$, to which spindle are attached the pistons $X^{15}$ and $X^{16}$, moving in the cylinders $X^8$, and $X^9$. The extension of the valve spindle, indicated at $X^{17}$, extends through the rear of the casing and is acted on by a spring $X^{19}$, which acts to keep the valve $X^{13}$, closed. $X^{20}$, indicates a lever adapted to act on the end of the spindle extension $X^{17}$, and by which the valve $X^{13}$, can be opened at will. Y, is a conduit also leading from the source of supply or from the pipe U, connected by branches $Y'$, $Y'$, etc., with each of the parts $X^{11}$, so that when compressed air is supplied to the conduits U, and Y, it is constantly admitted to the rear of the pistons $X^{16}$, and with sufficient pressure to overcome the power of the spring $X^{19}$, and hold the valve $X^{13}$, open except when compressed air is also admitted to the larger cylinder $X^8$, through the port $X^{10}$, in which case the valve $X^{13}$, is moved to its seat. The object of this valve is to avoid the compression on the opposite side of the engine piston which hampers greatly the process of starting.

The arrangements of the various starting valves and their connections with each other as shown in Fig. 13, is such that compressed air is admitted to each of the gas engine cylinder ends in turn at a time when, in the normal running of the engine, a charge of air would be expansively exploded in that cylinder end, and I may note here that while the special arrangement of the starting valves shown in the drawings is thoroughly adapted to accomplish this result, it is to be understood that I do not limit my claims to this particular arrangement since it is obvious, for instance, that instead of actuating the valves $V^8$, by the exhaust valve spindles R, R, etc., as shown, it would be perfectly feasible without departure from my invention to actuate these or other valves performing the same function from any other moving part of the engine which would at the proper times open and close the valves $V^8$.

In the construction shown in Fig. 13, the exhaust valve of the chamber $D'$, is opened and all the other exhaust valves closed; this, in the case of the engine illustrated, corresponds to the time when an explosion is normally to occur in the end of the cylinder connected with the exhaust casing $D^4$, consequently the chamber $V^7$, of the casing $V'$, is connected by the conduit $U^{11}$, with the casing $W^4$, of the outlet valve casing $D^4$. Again, when the exhaust valve of the casing $D^2$, opens an explosion is taking place in the end of the cylinder to which the exhaust casing $D'$, is attached consequently the casing $V^2$, is connected by the conduit $U^9$, with the casing $W'$. Again, when the exhaust valve of the casing $D^3$, is opened an explosion takes place in the cylinder end connected with the casing $D^2$, consequently the valve casing $D^3$, is connected by the conduit $U^6$, with the casing $W^2$, and when the exhaust valve of casing $D^4$, is opened an explosion is taking place in the end of the cylinder to which the casing $D^3$, is attached, consequently the casing $V^4$, is connected by the conduit $U^4$, with the casing $W^3$.

Referring now to the diagrammatic views; those shown in Figs. 9 to 12, show the operations of the cams, cam levers, admission and exhaust valves in connection with the motion of the eccentrics $H^{10}$, and $H^{11}$, the positions being illustrated for each half turn of the main shaft $H^{18}$, and through two consecutive revolutions of that shaft. The diagrams Figs. 14 to 17 inclusive show at the left hand side the condition as to the opening and closing of the engine valves and at the right hand side the positions of the pistons in the cylinders and the condition of the gas mixtures in the different ends of the cylinders. These last mentioned diagrammatic views are to be read in connection with the diagrams Figs. 9 to 12, Fig. 14 with Fig. 9, Fig. 15 with Fig. 10, Fig. 16 with Fig. 11, and Fig. 17 with Fig. 12. The diagrams show how the motions of the two eccentrics are distributed to move the valves properly on the four cycle principle. The triangles fully shaded in Figs. 14 to 17 indicating that these particular valves are wide open; the triangle partly shaded indicating the positions in the motion diagrammatically illustrated in which the valves in question open, but it is to be understood that the valves so shaded are in fact closed in the general position of parts indicated in the diagram. The make up of the diagrammatic Figs. 14 to 17 and 9 to 12, is based on Fig. 22, in which S, indicates the eccentric circle which it will be remembered describes one revolution while the main shaft of the engine is describing two revolutions, one quarter of the eccentric circle is therefore described during each stroke of the engine piston and equal to the time the valves are to be open whether they are inlet or outlet valves. The shaded segment in Fig. 22 represents that part of the stroke of the cam utilized to hold the valve open and may obviously be either at the right or at the left of the diagram. Thus, as shown, the quarter revolution from $S'$, to $S^2$, corresponds with the open shaded valve position $T'$, $T^2$, of the segments shown above the eccentric circle and corresponding to the segment shown in diagrams 14 to 17. The distance $T^2$, $T^3$, corresponds to the eccentric movement from $S^2$, to $S^3$, or from $S^4$, to $S'$, and the segment $T^3$, $T^4$, corresponds with the eccentric movement from $S^3$, to $S^4$.

It will readily be seen from the diagrammatic illustrations how the operation of the valves of the tandem cylinders and the four cycle operation of the engine is carried into effect by my mechanism. Thus, in the positions shown in Figs. 9 and 14, the valve $C'$, of cylinder B, is open, all the other valves of that cylinder being closed and the exhaust valve $D^4$, of cylinder $B'$, is open, all the other valves of that cylinder being closed, consequently we have as shown at the right of Fig. 14, admission at the left hand side of cylinder B, compression at the right hand side of cylinder B, explosion at the left hand side of cylinder $B'$, and exhaust at the right hand side of said cylinder. In diagrams, Figs. 10 and 15, all of the valves of cylinder B are closed, while in cylinder $B'$, the exhaust valve $D^3$, is open as is also the admission valve $C^4$, consequently we have admission at the right hand end of cylinder $B'$, exhaust at the left hand end of cylinder $B'$, explosion at the right hand end of cylinder B, and compression at the left hand end of cylinder B. In diagrams, Figs. 11 and 16, the exhaust valve $D^2$, of cylinder B, is open and the admission valve $C^3$ of the cylinder $B'$, is open, all the other valves being closed, consequently we have admission at the left hand end of cylinder $B'$, compression at the right hand end of the same cylinder, explosion at the left hand end of cylinder B and exhaust at the right hand end of cylinder B. Again in diagrams Figs. 12 and 17, exhaust valve $D'$, and admission valve $C^2$, of cylinder B, are open and all the valves of cylinder $B'$, closed, consequently we have admission at the right hand end of cylinder B, exhaust at the left hand end of that cylinder, explosion at the right hand end of cylinder $B'$, and compression at the left hand end of that cylinder. It will readily be seen that this sequence of valve movements provides for the four cycle action. In the diagrams I have indicated by the dotted lines marked Z, the sequence in which, in starting the engine compressed air is admitted into the various valve chambers and cylinder ends connected therewith and it only remains to work out the action of the various valves used in connection with starting of the engine, and the construction of which has already been noted.

It will be understood from what has already been stated that after the engine is in operation the air is cut off from the conduits U and Y, and therefore both of the valves $X^{13}$, and $W^{10}$, are held tight to their seats by their respective springs $X^{19}$, and $W^{12}$, and the starting system is thus entirely cut off from the operating engine, though it is possible through the lever $X^{20}$, to at any time open the valve $X^{13}$, and permit any compressed gas in the cylinder end connected therewith to exhaust to the chamber $X^5$, and exhaust pipe $X^{21}$. When it is desired to start the engine the compressed air is admitted to the pipes U, and Y, and passing through the pipes Y, and its branches $Y'$, $Y'$, etc., the full air pressure is admitted against the piston $X^{16}$, so as to hold all of the valves $X^{13}$, open making a free exhaust from each cylinder end of the engine. The air admitted through the conduit U, and through its branches as described find one of the engine exhaust valves open and consequently the valve $V^8$, controlled by the position of that exhaust valve also open, and is therefore enabled to pass through the valve casing $V'$, $V^2$, etc., which happens to be open, and thence through one of the connected air pipes to the valve casing $X'$, $X^2$, etc., which is connected with the engine exhaust valve casing in which at a corresponding time an explosion should normally occur, the air entering the chamber $W^5$, first passes out through the port $W^9$, and pipe $W^{13}$, into the port $X^{10}$, and cylinder $X^8$, of the casing $X'$, $X^2$, etc., which is attached to the same cylinder end and acting on the piston $X^{15}$, it closes the valve $X^{13}$. Afterward the accumulating pressure in the chamber $W^5$, overcomes the tension of the spring $W^{12}$ and opens the valve $W^{10}$, admitting the compressed air to the now entirely closed cylinder end, and acting on the gas engine piston, the air moves this piston and starts the engine in operation, but the movement thus imparted to the piston and the engine of course effects a normal shifting of the engine's exhaust valves causing the open exhaust valve to close and one of the other exhaust valves to open, but the closing of the exhaust valve at first opened effects the closing of its controlled piston valve $V^8$, so that further air supplied through that valve is cut off and the expansion of the air in the cylinder soon reduces the pressure in the chambers $W^5$, and $X^8$, enabling this spring to close the admission valve $W^{10}$, while the constant pressure on the piston $X^{16}$, soon so far exceeds the pressure acting on the piston $X^{15}$, that the exhaust valve $X^{13}$, is opened. Thus in regular sequence the air is admitted to the cylinder where at the time the conditions are such that it will provide the necessary effect on the engine pistons and the engine is rapidly brought into full operation, the admission valves for gas or air being free to work in their normal manner and the ignition of the explosive mixture introduced into the chambers soon bringing the engine into full operation, it being obvious of course that whenever an explosion occurs in a chamber to which compressed air is entering the pressure of the exploding gases will close both of the cylinders $X^{13}$, and $W^{10}$, and prevent the explosive impulse extending into the conduits and appliances connected through the starting ports.

Having now described my invention, what I claim as new, and desire to secure by Letters Patent is,

1. In a four-cycle gas engine, having one or more cylinder ends. starting mechanism comprising a source of compressed air, and means for admitting air from said source to each cylinder during and only during what in normal operation would be the working stroke portion of the cycle carried out in the cylinder end, and means for connecting each cylinder end to exhaust during what in normal operation would be the exhaust, suction and compression portions of the cycle carried out in the cylinder end.

2. In a four-cycle gas engine, having one or more working cylinder ends each with an inlet and exhaust valve, a valve gear for operating said valves on the four cycle plan, starting mechanism comprising a compressed air conduit leading to each cylinder end, a valve opening and closing each conduit and connected to said valve gear so as to be opened during and only during the period which in normal operation would be the working portion of the cycle carried out in the corresponding cylinder end, an auxiliary exhaust valve for each cylinder end and means for closing it and holding it open during the periods which in normal operation would be the working and suction and compression portions respectively of the cycle carried out in the cylinder end.

3. In a four cycle gas engine having one or more cylinder ends, each provided with main inlet and exhaust valves, starting mechanism comprising means for supplying compressed air to each cylinder during and only during the periods which in normal operation is the working period of the cycle carried out in the cylinder end and a separate exhaust valve closed in normal operation, resilient means normally holding it open during the starting operation, and means responsive to the admission of compressed air to the cylinder end for holding it closed in starting during the portion of the cycle during which compressed air is admitted to the corresponding cylinder end.

4. In a gas engine, starting mechanism consisting of compressed air conduits leading to each cylinder end to which air and gas is admitted in regular operation, in combination with cut-off valves situated in each said conduit, the exhaust valves of the engine cylinders, and means connecting individual exhaust valves with the individual cut-off valves as described and so that the opening of each exhaust valve will effect the opening of the cut-off valve controlling the admission of compressed air to the cylinder end in which, at a corresponding time in the regular operation of the engine, an explosion takes place.

5. In a gas engine, the combination with a cylinder end having entrance and exhaust valves of the starting mechanism comprising an inlet valve casing having an opening to the cylinder end and connected to a compressed air supply pipe, a valve normally closing the opening of said casing to the cylinder and held to its seat by resilient pressure which permits it to open when compressed air is admitted to the casing, means for opening and closing the air conduit supplying the inlet valve casing, a separate exhaust valve for the starting system normally closed when said system is not in operation, resilient means whereby said exhaust valve is held open when the starting system is in operation, and means for closing said valve on the admission of compressed air to the casing of the inlet valve casing.

6. In a gas engine, the combination with a cylinder end of an inlet valve casing having an opening to the cylinder end and connected to a compressed air supply pipe, a valve normally closing the opening of said casing to the cylinder and held to its seat by resilient pressure which permits it to open when compressed air is admitted to the casing, means for opening and closing the air conduit supplying the inlet valve casing, a separate exhaust valve casing also secured to the same cylinder end embodying cylinders of different sectional area, a valve adapted to close the port from the exhaust valve casing to the engine cylinder said valve having a stem extending through the cylinders in the casing, a piston secured to said stem and working in the casing cylinders, a spring acting on the stem to close the exhaust valve, a conduit connecting the inlet valve casing to the larger cylinder in the exhaust valve casing so that air admitted thereto will act to close the exhaust valve, and a compressed air conduit connected to the smaller cylinder of the exhaust valve casing so that the air pressure will tend to keep the valve open.

7. In a gas engine having fuel entrance and exhaust valves, starting mechanism consisting of compressed air conduits leading to each cylinder end to which air and gas is admitted in regular operation, in combination with cut-off valves situated in each said conduit, means actuated by moving parts of the engine connected to operate said valves as described, normally closed inlet valves controlling the port through which the air conduits connect with the cylinder ends and opening under the pressure of air therein when the cut-off valves open, exhaust valves for the starting system connected with each cylinder, means for holding said valves closed when the starting system is not in use, means for holding said exhaust valves open by resilient pressure when the starting system is in use, and means for closing said valves in turn actuated by the admission of compressed air to the starting conduit leading to the cylinder end with which the exhaust valve is connected.

8. In a gas engine having fuel entrance and exhaust valves, starting mechanism consisting of compressed air conduits leading to each cylinder end to which air and gas is admitted in regular operation, in combination with cut-off valves situated in each said conduit, the exhaust valves of the engine cylinders, and means connecting individual exhaust valves with the individual cut-off valves as described and so that the opening of each exhaust valve will effect the opening of the cut-off valve controlling the admission of compressed air to the appropriate cylinder end, normally closed inlet valves controlling the ports through which the air conduits connect with the cylinder ends and opening under the pressure of air therein when the cut-off valves open, exhaust valves for the starting system connected with each cylinder, means for holding said valves closed when the starting system is not in use, means for holding said exhaust valves open by resilient pressure when the starting system is in use, and means for closing said valves in turn actuated by the admission of compressed air to the starting conduit leading to the cylinder end with which the exhaust valve is connected.

GUSTAV B. PETSCHE.

Witnesses:
ARNOLD KATZ,
D. STEWART.